US006821251B2

United States Patent
Alexandru

(10) Patent No.: US 6,821,251 B2
(45) Date of Patent: Nov. 23, 2004

(54) MULTIPLEXER FOR CONNECTING A MULTI-ROW ULTRASOUND TRANSDUCER ARRAY TO A BEAMFORMER

(75) Inventor: Radu Alexandru, Cheshire, CT (US)

(73) Assignee: Aloka Co., Ltd. (JP)

( * ) Notice: Subject to any disclaimer, the term of this patent is extended or adjusted under 35 U.S.C. 154(b) by 167 days.

(21) Appl. No.: 10/322,330

(22) Filed: Dec. 18, 2002

(65) Prior Publication Data

US 2004/0122321 A1 Jun. 24, 2004

(51) Int. Cl.[7] ................................................. A61B 8/00
(52) U.S. Cl. ....................................................... 600/447
(58) Field of Search ............................... 600/443, 447; 128/916; 73/625–626; 367/103, 105, 122, 135

(56) References Cited

U.S. PATENT DOCUMENTS

| | | | | | |
|---|---|---|---|---|---|
| 4,219,846 A | * | 8/1980 | Auphan | ....................... | 348/163 |
| 5,027,820 A | * | 7/1991 | Pesque | ....................... | 600/443 |
| 5,301,168 A | * | 4/1994 | Miller | ....................... | 367/138 |
| 5,490,512 A | * | 2/1996 | Kwon et al. | ................. | 600/447 |
| 5,520,186 A | * | 5/1996 | Deitrich | ....................... | 600/437 |
| 5,520,187 A | * | 5/1996 | Snyder | ....................... | 600/459 |
| 5,677,491 A | * | 10/1997 | Ishrak et al. | ................... | 73/641 |
| 5,832,923 A | * | 11/1998 | Engeler et al. | ............. | 600/459 |
| 6,089,096 A | * | 7/2000 | Alexandru | ................... | 73/626 |
| 6,183,419 B1 | * | 2/2001 | Wildes | ....................... | 600/447 |

* cited by examiner

Primary Examiner—Francis J. Jaworski
(74) Attorney, Agent, or Firm—Bachman & LaPointe, P.C.

(57) ABSTRACT

A system for connecting an transducer matrix array to a beamformer via a multiplexer where the multiplexer includes a plurality of numbered switches, the array including a plurality of rows and columns where the rows include plural center rows the elements of which are uniquely associated with a numbered switch portion and a top row associated with first and second numbered switches offset by L in first and second differing directions with respect to one of the center row elements, and a bottom row associated with third and fourth numbered switches offset by L in first and second differing directions with respect to the one of the center row elements.

24 Claims, 3 Drawing Sheets

|   | | | | | | | | | | | | | | | | | | | | | | | | | |
|---|---|---|---|---|---|---|---|---|---|---|---|---|---|---|---|---|---|---|---|---|---|---|---|---|---|
| A | 2 | 3 | 4 8 | 5 9 | 6 10 | 7 11 | 0 12 | 1 13 | 2 14 | 3 15 | 4 8 | 5 9 | 6 10 | 7 11 | 0 12 | 1 13 | 2 14 | 3 15 | 4 8 | 5 9 | 6 10 | 7 11 | 12 | 13 | |
| B | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | |
| C | 8 | 9 | 10 | 11 | 12 | 13 | 14 | 15 | 8 | 9 | 10 | 11 | 12 | 13 | 14 | 15 | 8 | 9 | 10 | 11 | 12 | 13 | 14 | 15 | |
| D | 16 | 17 | 18 | 19 | 20 | 21 | 22 | 23 | 16 | 17 | 18 | 19 | 20 | 21 | 22 | 23 | 16 | 17 | 18 | 19 | 20 | 21 | 22 | 23 | |
| E | 24 | 25 | 26 | 27 | 28 | 29 | 30 | 31 | 24 | 25 | 26 | 27 | 28 | 29 | 30 | 31 | 24 | 25 | 26 | 27 | 28 | 29 | 30 | 31 | |
| F | 26 | 27 | 28 16 | 29 17 | 30 18 | 31 19 | 24 20 | 25 21 | 26 22 | 27 23 | 28 16 | 29 17 | 30 18 | 31 19 | 24 20 | 25 21 | 26 22 | 27 23 | 28 16 | 29 17 | 30 18 | 31 | 20 | 21 | |

FIG. 2

|   | | | | | | | | | | |
|---|---|---|---|---|---|---|---|---|---|---|
| A | | | | | | | | | | |
| B | | | 0 | 1 | 2 | 3 | 4 | 5 | 6 | 7 |
| C | | | 8 | 9 | 10 | 11 | 12 | 13 | 14 | 15 |
| D | | | 16 | 17 | 18 | 19 | 20 | 21 | 22 | 23 |
| E | | | 24 | 25 | 26 | 27 | 28 | 29 | 30 | 31 |
| F | | | | | | | | | | |

MULTIPLEXER FOR CONNECTING A MULTI-ROW ULTRASOUND TRANSDUCER ARRAY TO A BEAMFORMER

BACKGROUND OF THE INVENTION (1) Field of the Invention

The present invention relates to a multiplexer for connecting a multi-row ultrasound transducer array to a beamformer. More specifically, this invention relates to an ultrasound imaging system which employs a multi-row transducer array with more elements than the number of channels of the system's beamformer.

(2) Description of Related Art

In ultrasound imaging, a transducer is used first to transmit ultrasound waves into the medium to be examined, for example a region of the human body, and then to receive the ultrasound echoes from various discontinuities in the medium and to transform them into electrical signals. The electrical signals then undergo a number of processing steps and are eventually transformed into an image which can be displayed on a device such as a cathode ray tube or can be printed in order to be examined by a physician.

Many ultrasound transducers consist of arrays of small piezoelectric elements. In these cases, the transmit operation is controlled by a multi-channel transmit beamformer, which activates with each channel one or a small group of elements applying various delays, amplitudes and wave shapes in order to produce ultrasound beams propagating in the desired direction and focused at a certain depth along that direction.

Subsequently a multi-channel receive beamformer receives on each channel the signal from one or a small number of elements, delays and amplifies the channel signals and sums them to obtain the focused beam from points along the desired direction. In many cases the number of elements of the array is larger than the number of beamformer channels which can be economically provided. A multiplexer is then used to connect subsets of elements to the beamformer channels.

A large class of transducer arrays, known as 1D (one-dimensional) linear or convex arrays, consists of rectangular elements placed next to each other in the azimuthal direction or along a straight or curved line in the image plane. For these arrays the multiplexers are usually designed to select for each beam a group of elements equal to the number of beamformer channels in the system, currently on the order of 32 channels for a low cost system up to 256 channels for a high-end system. More recently multi-row arrays have come into use. Multi-row arrays have at each azimuthal position several elements (one in each row) arranged in the elevation direction, or perpendicular to the image plane. The multi-row arrays allow changing the depth of focus both in the azimuthal and elevational directions, while the 1D arrays have fixed focus in the elevational direction. In addition, the multi-row arrays are advantageous when aberration correction is employed. Multi-row arrays may be used as 1.25D (groups of elements at the same azimuthal position connected together to the same beamformer channels to control the effective element height), 1.5D (elevationally symmetric pairs of elements connected to the same channels to provide true elevational focusing) or 1.75D (each element connected to a different channel, as needed when aberration correction is used). In the 1.5D and 1.75D cases the number of beamformer channels needed in order to maintain the same azimuthal aperture as in the 1D case increases in proportion to the number of row pairs or rows respectively. In order to operate these multi-row arrays without increasing the number of beamformer channels beyond economically acceptable numbers, synthetic aperture techniques are used, where the beam is transmitted multiple times and each time the multiplexer selects a different subaperture for receive, and the beam is synthesized from multiple receive subapertures.

Existing multi-row arrays often implement mutliplexers which do not allow for an optimal selection of advantageous subaperture. In addition, the number of switches in such multi-row arrays is larger that the minimum necessary to implement the necessary multiplexing requirements. There is therefore needed a multiplexer design which allows for the selection of subapertures for a synthetic aperture technique using relatively few switches.

SUMMARY OF THE INVENTION

Accordingly, it is an object of the present invention to provide an ultrasound imaging system, and method for using same, which employs a multi-row transducer array with more elements than the number of channels of the system's beamformer.

In accordance with the present invention, a system for connecting a transducer array to a beamformer via a multiplexer comprises a multiplexer comprising a plurality of numbered switches a transducer array comprising a plurality of elements arranged in a matrix each element associated with at least one of the numbered switches the matrix comprising a plurality of rows and columns the plurality of rows comprising, a plurality of center rows the elements comprising each of the plurality of center rows associated with a unique portion of the numbered switches wherein each of the center row elements is associated with one of the unique portion the numbered switches, a top row the elements comprising the top row associated with a first and second numbered switch the first numbered switch equal to the numbered switch associated with one of the plurality of center rows elements offset in a first direction in relation to the top row element by an offset of L and the second numbered switch equal to the numbered switch associated with one of the plurality of center rows elements offset in a second direction in relation to the top row element by an offset of L, and a bottom row the elements comprising the bottom row associated with a third and forth numbered switch the third numbered switch equal to the numbered switch associated with one of the plurality of center rows elements offset in a first direction in relation to the bottom row element by an offset of L and the fourth numbered switch equal to the numbered switch associated with one of the plurality of center rows elements offset in a second direction in relation to the bottom row element by an offset of L.

BRIEF DESCRIPTION OF THE DRAWINGS

FIG. 2 A schematic diagram of a 6-row by 24-column array and its possible connections via the multiplexer of the present invention to the 32 channels of a beamformer.

FIG. 3 A schematic diagram of a 6-row by 24-column array and its possible connections via the multiplexer of the present invention showing only the switches which are closed to select a first subaperture.

FIG. 4 A schematic diagram of a 6-row by 24-column array and its possible connections via the multiplexer of the present invention showing only the switches which are closed to select a second subaperture.

FIG. 5 A schematic diagram of a 6-row by 24-column array and its possible connections via the multiplexer of the present invention showing only the switches which are closed to select an alternative selection of the second subaperture.

DETAILED DESCRIPTION OF THE PREFERRED EMBODIMENT(S)

Figure 1:
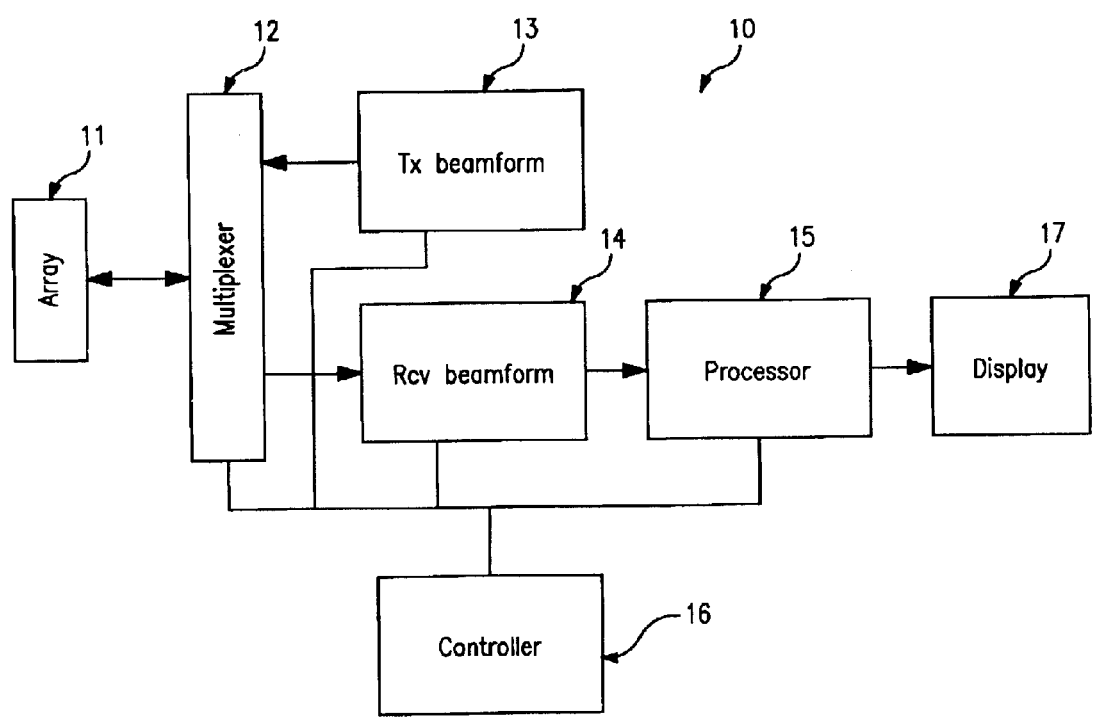
FIG. 1 A block diagram of an ultrasound imaging system incorporating a multiplexer of the present invention.

The present invention provides a multiplexer design which allows for the selection of apertures for use in a synthetic aperture technique using relatively few switches. The present invention associates switches of the multiplexer with transducer array elements in such a fashion as to allow for optimal efficiency in selecting and configuring the apertures required for imaging.

The present invention, while herein described with respect to a 1.75D transducer array, is not so limited. Rather, the configuration of the present invention as detailed below may be extended and applied to a 1.5D configuration by providing fixed hard-wired connections between elements symmetrical relative to the azimuthal axis of the transducer array and by eliminating half of the multiplexer switches and of the beamformer channels.

In an ultrasound imaging system of the present invention, a multiplexer connects a multi-row, preferably a six-row, transducer array to a transmit beamformer having less channels than the number of transducer elements in the array. The multiplexer is optimized to select, transmit and receive element groups appropriate for certain synthetic aperture imaging modes. The multiplexer uses relatively few switches, namely one switch per element for the four center rows and two switches per element for the remaining top/bottom rows. In a preferred embodiment, each of the four center rows is assigned one quarter of the beamformer channels, and the switches for the center rows are configured to connect the elements to the assigned channels in the same manner as in traditional 1D arrays with cycles equal to one quarter of the channel number. The top/bottom rows' elements have two sets of switches each also configured as for 1D arrays, and for each pair of rows symmetrical relative to the azimuthal axis, each of the four sets of switches is connected to another portion, preferably a quarter, of the beamformer channels. The two switch sets of each off-center row are connected to the beamformer channels one with a forward and the other with a backward offset of L channels relative to the connection of the center rows.

With reference to FIG. 1, there is illustrated a simplified block diagram of an ultrasound imaging system 10 in which the multiplexer 12 of the present invention is used. The ultrasound imaging system 10 includes a transducer array 11, a multiplexer 12, a transmit beamformer 13, a receive beamformer 14, a processor 15, a controller 16, and a display 17. To produce an image the system 10 proceeds to perform the following sequence of operations described herein.

The array 11 is comprised of rectangular matrix of active elements. The controller 16 programs the multiplexer 12 to connect a certain group of elements of the array 11 to the transmit channels of the transmit beamformer 13 and of the receive beamformer 14. The controller 16 then initiates a transmit operation in which the transmit beamformer 13 generates voltage waveforms of various delays, amplitudes and shapes on its various channels and applies these waveforms to selected elements of the transducer array 11 via the closed switches of the multiplexer 12.

The elements of the transducer array 11 receiving the transmit waveforms vibrate and generate acoustic waves in the medium. In certain operating modes, such as the synthetic aperture mode, the controller 16 reprograms the multiplexer 12 after the transmit step such that a different group of elements is used for receiving and transmitting. The acoustic waves propagate in the medium and are partially reflected at discontinuities generating echoes which return to the transducer array 11. The echoes are transformed by the elements of the transducer array 11 into echo voltage waveforms which are applied via the closed switches of the multiplexer 12 to the input channels of the receive beamformer 14.

This sequence of operations may take place once or multiple times for each image. The receive beamformer 14 reconstructs from each or from several sets of echo voltage waveforms a signal indicative of the acoustic properties at certain points in the medium. These signals are further processed in the processor 15 (which may in turn contain several mode-specific signal and image processors) and transformed into images which may be displayed on a display device 17 or may be printed, stored or transferred via a communication link.

In the imaging systems to which the present invention is drawn, the transducer array 11 has a two-dimensional matrix structure consisting of six rows and a much larger number of columns. The transmit beamformer 13 and receive beamformer 14 have 8×R channels where R is an integer. Typically the number of channels is on the order of 128 to 256 (i.e. where R equals 16 and 32 respectively).

With reference to FIG. 2, there is illustrated a schematic representation of a 6-row by 24-column transducer array 11 and its possible connections via the multiplexer 12 of the present invention to the 32 channels of a beamformer 13, 14. While illustrated in exemplary fashion with the aforementioned configuration, an implementation of the present invention will typically have a larger number of columns (typically 128 to 256) and of beamformer channels (typically 128 to 256).

Each rectangle in the transducer array 11 represents a transducer element 31. The six rows are labeled with the letters A to F along with the left side of the transducer array 11. The numerals inside each element represent multiplexer switches 32 and each number indicates the beamformer channel number to which the transducer element 31 is connected via the respective multiplexer switch 32. The multiplexer 12 is configured according to the teachings of the invention described above. Specifically, in the illustrated preferred embodiment, the four center rows B,C,D,E are each connected with one switch per element to one quarter of the beamformer channels each, namely channels 0 to 7 for row B, 8 to 15 for row C, etc., and the top and bottom rows are connected with two sets of switches each and with forward and backward offsets of L=2 elements.

For example, the elements of row A have a set of switches connected to channels 0 to 7 with a forward offset of 2 elements relative to the elements of row B of the same column, and a second set of switches connected to channels 8 to 15 with a backward offset of 2 elements relative to the elements of row C of the same column. With this arrangement, the multiplexer can select a number of useful subapertures with the limitations that the number of elements selected for each row cannot exceed one quarter of the number of multiplexer channels, in this example 8 elements, and that no more than one element should be connected to the same channel at a time.

Thus, when an aperture 33 of 4×8 elements is sufficient, as would be the case for imaging at shallow depths, such an aperture 33 may be connected by the multiplexer 12 to the thirty-two beamformer channels by closing a set of switches as shown in FIG. 3, which is obtained from FIG. 2 by deleting all but the active (closed) multiplexer switches. This aperture 33 is used both to transmit and to receive. To move this aperture 33 by one position to the right along the array the switches in the leftmost active column are opened freeing four beamformer channels, and the switches connected to these channels and to the elements in the column to the right of the aperture are closed. By repeating this operation, which is made possible by the cyclical arrangement of the switches of the multiplexer, the aperture can be moved to any azimuthal position on the array.

When an aperture 33 with more elements than the number of beamformer channels is needed, it can be synthesized by temporarily storing the signals received with a first aperture 33 and transmitting at least a second time from the same aperture 33 as that shown in FIG. 3, then changing the status (open/closed) of the multiplexer switches to select a second receive aperture whose elements are different than those of the first one. Then the signals from the first and second receive apertures can be delayed, weighted and summed to synthesize a receive aperture equivalent to the first and second apertures combined. In the configuration of FIG. 2 the multiplexer of the present invention allows selecting a second aperture which extends the first one horizontally by M=L columns in each (left and right) direction and vertically by one row in each (up and down) direction, with active elements in only 2×N=4(R−L) columns of each of the top and bottom extension rows.

Figures 4, 5:
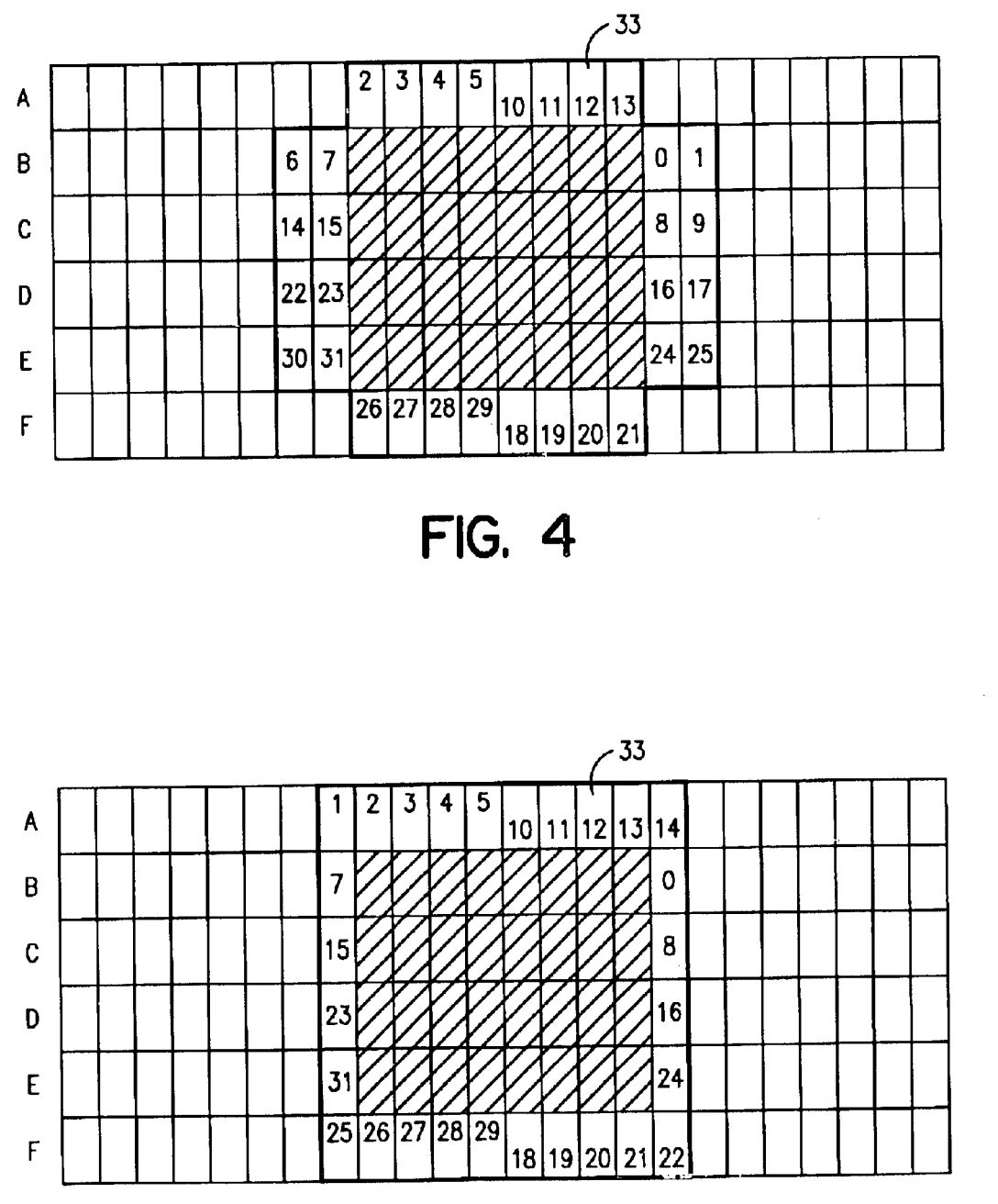

FIG. 4 shows such a second receive aperture 33 extending the first aperture 33 of FIG. 3 (marked with hatched /// lines in FIG. 4). In FIG. 4, M=2 and the top and bottom rows have 2×N=8 elements each.

Other selections of N and M are also possible with this configuration, as shown for example in FIG. 5 where the azimuthal extension of the aperture 33 has been reduced to M=1 thus freeing up channels for increasing the number of elements in the top/bottom rows to 2×N=10. It is also possible to choose apertures 33 with larger lateral extent and less elements in the top/bottom rows. However these modifications of the aperture shape are sometimes suboptimal in the sense that some beamformer channels may remain unused, as is the case in FIG. 5. The following mathematical relations can be used to choose an optimal offset L given the number of beamformer channels and the desired aperture shape:

$$N=2(R-M) \quad (1)$$

$$L=M \quad (2)$$

The 2-transmit synthetic aperture scheme described above and illustrated in FIGS. 3 and 4 is a preferred use of the multiplexer of the invention.

In a preferred embodiment, the multiplexer of the invention is built into the transducer housing thus greatly reducing the number of coaxial cables connecting the transducer to the system (instead of one cable per transducer element, for example 6×256=1536 cables, only one cable per beamformer channel, for example 256 cables total would be necessary). The multiplexer can also be built in the probe's connector housing or in the system, thus requiring less effort in circuit miniaturization. It is also possible to use two separate multiplexers, one for transmit and one for receive, in which case only the receive multiplexer must be implemented according to the invention while the transmit multiplexer may be of conventional construction, with only one switch per element. This would eliminate the need to change the multiplexer status between transmit and receive, operation which may generate electrical noise.

It is apparent that there has been provided in accordance with the present invention ultrasound imaging system, and method for using same, which employs a multi-row transducer array with more elements than the number of channels of the system's beamformer which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A system for connecting a transducer array to a beamformer via a multiplexer comprising:
 a multiplexer comprising a plurality of numbered switches;
 a transducer array comprising a plurality of elements arranged in a matrix each element associated with at least one of said numbered switches said matrix comprising a plurality of rows and columns said plurality of rows comprising:
  a plurality of center rows said elements comprising each of said plurality of center rows associated with a unique portion of said numbered switches wherein each of said center row elements is associated with one of said unique portion said numbered switches;
  a top row said elements comprising said top row associated with a first and second numbered switch said first numbered switch equal to said numbered switch associated with one of said plurality of center rows elements offset in a first direction in relation to said top row element by an offset of L and said second numbered switch equal to said numbered switch associated with one of said plurality of center rows elements offset in a second direction in relation to said top row element by an offset of L; and
  a bottom row said elements comprising said bottom row associated with a third and forth numbered switch said third numbered switch equal to said numbered switch associated with one of said plurality of center rows elements offset in a first direction in relation to said bottom row element by an offset of L and said fourth numbered switch equal to said numbered switch associated with one of said plurality of center rows elements offset in a second direction in relation to said bottom row element by an offset of L.

2. The system of claim 1 wherein a number of said plurality of numbered switches is equal to 8×R where R is an integer number.

3. The system of claim 2 wherein R equals 16.

4. The system of claim 2 wherein R equals 32.

5. The system of claim 2 wherein each of said unique portions of said numbered switches associated with each of said plurality of center rows comprises (8×R)/4 of said numbered switches.

6. The system of claim 5 wherein said multiplexer is adapted to
 i) apply a plurality of generated voltage waveforms to a plurality of said elements via a first plurality of said switches; and (ii) apply a plurality of echo voltage waveforms to a plurality of input channels via a second plurality of said switches.

7. The system of claim 6 wherein said first plurality of switches differs from said second plurality of switches.

8. The system of claim 7 wherein said first plurality of switches corresponds to a first aperture comprised of said elements said first aperture comprising a first width and a first height.

9. The system of claim 8 wherein said second plurality of switches corresponds to a second aperture comprised of said elements said second aperture comprising a second width and a second height.

10. The system of claim 9 wherein said second width exceeds said first width by 2×M of said elements wherein M is an integer number.

11. The system of claim 10 wherein M is equal to said offset L.

12. The system of claim 10 wherein a number of active elements in said top row and said bottom row equals 2×N.

13. The system of claim 12 wherein N is equal to 2(R−M).

14. The system of claim 9 wherein said second height exceeds said first height by one element.

15. The system of claim 1 additionally comprising a housing comprising said multiplexer and said transducer array.

16. An ultrasound imaging system comprising:
   a multiplexer comprising a plurality of switches said multiplexer adapted to
      (i) apply a plurality of generated voltage waveforms to a plurality of transducer array elements via a first plurality of said switches; and
      (ii) apply a plurality of echo voltage waveforms to a plurality of input channels via a second plurality of said switches;
   a transmit beamformer comprising a plurality of transmit channels adapted to generate said plurality of generated voltage waveforms;
   a receive beamformer comprising said plurality of input channels adapted to receive said plurality of echo voltage waveforms and output a reconstructed signal; and
   a transducer array comprising:
      a first center row comprising a plurality of said transducer array elements equal in number to a first portion of said number of beamformer channels, each element connected with a single switch to one of said first portion of said number of beamformer channels;
      a second center row comprised a plurality of said transducer array elements equal in number to a second portion of said number of beamformer channels, each element connected with a single switch to one of said second portion of said number of beamformer channels;
      a third center row comprising a plurality of said transducer array elements equal in number to a third portion of said number of beamformer channels, each element connected with a single switch to one of said third portion of said number of beamformer channels;
      a fourth center row comprising a plurality of said transducer array elements equal in number to a fourth portion of said number of beamformer channels, each element connected with a single switch to one of said fourth portion of said number of beamformer channels;
      a top row comprising a plurality of said transducer array elements each connected with a least one switch to one of said first portion of said number of beamformer channels forward offset in relation to said first center row by an offset of L elements and to one of said second portion of said number of beamformer channels backward offset by an offset of said L elements; and
      a bottom row comprising a plurality of said transducer array elements each connected with a least one switch to one of said third portion of said number of beamformer channels backwards offset in relation to said third center row by an offset of said L elements and to one of said fourth portion of said number of beamformer channels forward offset by an offset of said L elements.
   wherein said transducer array is adapted to
      (i) receive said generated voltage waveforms;
      (ii) generate and propagate acoustic waves at a medium; and
      (iii) receive said plurality of echo voltage waveforms.

17. The ultrasound imaging system of claim 16, wherein said first plurality of switches differs from said second plurality of switches.

18. The ultrasound imaging system of claim 16, wherein a number of said plurality of transmit channels and said plurality of input channels is equal to 8×R where R is an integer number.

19. The ultrasound imaging system of claim 18, wherein R equals 16.

20. The ultrasound imaging system of claim 18, wherein R equals 32.

21. The ultrasound imaging system of claim 20, wherein said second plurality of said switches corresponds to a second aperture comprising a width and a height.

22. The ultrasound imaging system of claim 21, wherein said width is extended by 2×M of said transducer array elements equal to said offset L.

23. The ultrasound imaging system of claim 21, wherein said height is extended up and down by one row.

24. The ultrasound imaging system of claim 16, wherein each of said first portion, said second portion, said third portion, and said fourth portion of said beamformer channels each equals one quarter of a number of said beamformer channels.

* * * * *